(12) United States Patent
Jiang et al.

(10) Patent No.: US 12,339,009 B2
(45) Date of Patent: Jun. 24, 2025

(54) OVEN INTEGRATED WITH FUNCTIONS OF FRYING, ROASTING AND SMOKING

(71) Applicant: Zhejiang Fudeer Electric Appliance Co., Ltd., Zhejiang (CN)

(72) Inventors: Junhua Jiang, Zhejiang (CN); Meide Jiang, Zhejiang (CN)

(73) Assignee: Zhejiang Fudeer Electric Appliance Co., Ltd., Zhejiang (CN)

( * ) Notice: Subject to any disclaimer, the term of this patent is extended or adjusted under 35 U.S.C. 154(b) by 548 days.

(21) Appl. No.: 17/719,714

(22) Filed: Apr. 13, 2022

(65) Prior Publication Data
US 2023/0175701 A1    Jun. 8, 2023

Related U.S. Application Data

(63) Continuation of application No. 29/818,337, filed on Dec. 8, 2021, now Pat. No. Des. 1,022,579.

(51) Int. Cl.
| | |
|---|---|
| F24C 15/18 | (2006.01) |
| A23B 4/052 | (2006.01) |
| A47J 37/06 | (2006.01) |
| A47J 37/12 | (2006.01) |
| F24C 15/16 | (2006.01) |

(52) U.S. Cl.
CPC ............ *F24C 15/18* (2013.01); *A23B 4/052* (2013.01); *A47J 37/0629* (2013.01); *A47J 37/1204* (2013.01); *F24C 15/16* (2013.01)

(58) Field of Classification Search
CPC .......... F24C 15/16; F24C 15/18; A23B 4/052; A47J 37/0629; A47J 37/1204
USPC ........................................... 126/273
See application file for complete search history.

(56) References Cited

U.S. PATENT DOCUMENTS

| | | | | |
|---|---|---|---|---|
| 3,455,233 A | * | 7/1969 | Cable .................... | A47J 37/04 |
| | | | | 99/443 |
| 3,938,494 A | * | 2/1976 | Clark .................... | A47J 37/06 |
| | | | | 126/41 |
| 6,166,353 A | * | 12/2000 | Senneville ............ | F24C 15/08 |
| | | | | 219/385 |

(Continued)

FOREIGN PATENT DOCUMENTS

| | | | | |
|---|---|---|---|---|
| CN | 20110038987 A | * | 4/2011 | ............. A47J 37/06 |
| CN | 204600239 U | * | 4/2015 | ............. A47J 37/06 |

(Continued)

*Primary Examiner* — Michael G Hoang
*Assistant Examiner* — Elizabeth Ann Laughlin
(74) *Attorney, Agent, or Firm* — Cooper Legal Group, LLC

(57) ABSTRACT

Disclosed is an oven integrated with functions of frying, roasting and smoking, comprising: a lower oven body and an upper oven body; the lower oven body comprises a lower oven base, a roasting cavity is formed on a side wall of the lower oven base, a load grid is arranged in the roasting cavity, a smoking box and a water basin are arranged in the roasting cavity, a first heating component is provided on the lower oven base, the first heating component is configured for heating the smoking box to produce smoke and for heating the water basin, and a cover plate for closing the roasting cavity is hinged with the lower oven base; the upper oven body comprises an upper oven base arranged on the lower oven base, a frying pan is provided on the upper oven base, a grill is detachably arranged on the frying pan.

6 Claims, 6 Drawing Sheets

(56) References Cited

U.S. PATENT DOCUMENTS

| | | | |
|---|---|---|---|
| 7,301,127 B1 * | 11/2007 | Derridinger | A47J 37/04 219/386 |
| 7,703,386 B1 * | 4/2010 | Bourgeois | A47J 37/00 99/340 |
| 2013/0206016 A1 * | 8/2013 | Diaz | A47J 37/07 99/339 |
| 2022/0110482 A1 * | 4/2022 | Konrath | A47J 37/07 |

FOREIGN PATENT DOCUMENTS

| | | | | |
|---|---|---|---|---|
| CN | 210077426 U | * | 2/2019 | A47J 37/06 |
| FR | 3060961 B1 | * | 9/2019 | A47J 37/01 |
| GB | 2424360 A | * | 9/2006 | A47J 37/06 |
| WO | WO 2017/060877 A1 | * | 4/2017 | A47J 37/07 |
| WO | WO 2020/245328 A1 | * | 12/2020 | A47J 37/07 |

* cited by examiner

OVEN INTEGRATED WITH FUNCTIONS OF FRYING, ROASTING AND SMOKING

CROSS-REFERENCE TO RELATED APPLICATION

This application claims priority to U.S. patent application Ser. No. 29/818,337, filed on Dec. 8, 2021. The entirety of the above-mentioned patent application is hereby incorporated by reference herein and made a part of this specification.

TECHNICAL FIELD

The present application relates to the field of barbecue equipment, and in particular, to an oven integrated with functions of frying, roasting and smoking.

BACKGROUND ART

Household appliances with a function of barbecue or frying that are available in the market only have a single function, which cannot meet requirements for the diversified functions and needs to be improved.

SUMMARY

In order to improve the solution of single function of barbecue or pan-frying household appliances, the present application provides an oven integrated with functions of frying, roasting and smoking.

The present application provides an oven integrated with functions of frying, roasting and smoking, which adopts the following technical solution:

an oven integrated with functions of frying, roasting and smoking includes a lower oven body and an upper oven body;

the lower oven body comprises a lower oven base, a roasting cavity is formed on a side wall of the lower oven base, a load grid is arranged in the roasting cavity, a smoking box and a water basin are arranged in the roasting cavity, a first heating component is provided on the lower oven base, the first heating component is configured for heating the smoking box to produce smoke and for heating the water basin, and a cover plate for closing the roasting cavity is hinged with the lower oven base;

the upper oven body comprises an upper oven base arranged on the lower oven base, a frying pan is provided on the upper oven base, a grill is detachably arranged on the frying pan, a second heating component is provided on the upper oven base, and the second heating component is configured for heating the frying pan.

In the above technical solution, by setting the roasting cavity and the smoking box, the smoking box can be filled with smoking materials. The effect of fumigation can be realized by heating the smoking box through the first heating component to make the smoking material produce smoke. The ingredients can also be put on the load grid, and the low-temperature tender roasting can be realized after sealing through the first heating component, the roasting cavity and the cover plate. In addition, the water basin can be filled with water and ingredients to realize the taste of boiled water. The frying pan of the upper oven body can be used for pan-frying or frying according to the amount of oil. When the grill is arranged, the barbecue food can also be realized. In addition, the ingredients can also be processed through the cooperation of the lower oven body and the upper oven body. For example, the ingredients after the fumigation are further pan-fried, or the ingredients after tender roasting in the roasting cavity are further fried or roasted. The integrated oven for pan-frying, roasting and fumigation has rich functions, and can cook foods with various flavors, such as pan-frying, frying, low-temperature tender roasting, tender roasting inside and fried roasting outside, fumigation and roasting, making the processing of the ingredients more diversified.

In particular, a bearing frame is arranged in the roasting cavity, the bearing frame is arranged under the load grid and above the first heating component, and a first accommodating hole and a second accommodating hole are formed on the bearing frame;

the smoking box is arranged in the first accommodating hole, a first limiting flange is formed on the smoking box, and the first limiting flange is configured to restrict the smoking box from penetrating through the first accommodating hole;

the water basin is arranged in the second accommodating hole, and a second limiting flange is formed on the water basin, and the second limiting flange is configured to restrict the water basin from penetrating through the second accommodating hole.

In the above technical solution, the setting of the bearing frame, the smoking box is arranged and positioned through the first accommodating hole, and the water basin is arranged and positioned through the second accommodating hole, making the overall installation more convenient.

In particular, a plurality of load grids are arranged in a vertical direction in three layers, a plurality of support blocks are provided on each of two inner side walls, opposite to each other, of the roasting cavity, the plurality of support blocks are arranged in four layers in a vertical direction, and support blocks that are arranged in an upper three layers of the four layers are arranged under the three layers of the load grids in one-by-one correspondence with the load grids for supporting the load grids, support blocks in the lowest layer are arranged under the bearing frame for supporting the bearing frame.

In the above technical solution, the load grid and the bearing frame are supported by the support block, to realize the convenient disassembly of the load grid and the bearing frame. The load grid can be selected for installation according to the actual situation, and the bearing frame is convenient for disassembly and assembly, which is convenient to supplement the fumigation ingredient in the smoking box and replace the water in the water basin, making the overall use more flexible and convenient.

In particular, the first heating component is an electric heating tube, a support part is arranged in the roasting cavity under the first heating component, and one or more tightening strips are arranged on the support part for fixing the first heating component on an upper end face of the support part.

In the above technical solution, the setting of the support part and the tightening strip, the first heating component is supported by the support part and fixed by the tightening strip, so that the structure of the first heating component after installation is more stable.

In particular, an inner bottom surface of the roasting cavity is in a shape of a gradually shrinking notch, a mounting cavity is formed on a side wall of the lower oven base, and the mounting cavity is arranged under the roasting cavity;

an oil outlet is provided at a lowest part of the bottom surface of the roasting cavity, a lower end of the oil outlet communicates with the mounting cavity, a grease pan is arranged in the mounting cavity under the oil outlet for collecting oil discharged from the oil outlet, and the grease pan is slidably connected to the mounting cavity in a horizontal direction so that the grease pan is able to be pulled out from the mounting cavity.

In the above technical solution, the oil outlet and the grease pan are arranged to facilitate the timely discharge of the oil in the roasting cavity to the grease pan along the oil outlet. The sliding setting of the grease pan is convenient for the timely cleaning of the grease pan, making the overall use more convenient.

In particular, the roasting cavity and the mounting cavity are provided on a front end face of the lower oven base, a closing plate is hinged with the front end face of the lower oven base, a hinge axis of the closing plate is horizontal and parallel to the front end face of the lower oven base, a hinge axis of the closing plate is lower than the mounting cavity, and a length of the closing plate in a hinge axis direction is greater than a width of the roasting cavity, the closing plate is configured for closing the mounting cavity; the closing plate is provided with an abutting part, when the closing plate is turned to the abutting part to abut against the front end face of the lower oven base, the closing plate extends away from the lower oven base.

In the above technical solution, when the closing plate is turned over and opened, the ingredient are taken out from the roasting cavity, the closing plate can form a receiving part below. On the one hand, it can reduce the direct drop of oil to the ground. On the other hand, it can also fall on the closing plate in case of the ingredients falling. In addition, it can also be used to put some sundries, making the overall use more convenient.

In particular, a magnet is arranged in the mounting cavity, and the closing plate is made of ferromagnetic material; when the closing plate closes the mounting cavity, the closing plate is attached by the magnet.

In the above technical solution, the setting of the magnet, the structure of the closing plate is more stable after being covered by the magnet.

In particular, a fixed groove is formed on an upper end face of the frying pan for accommodating the grill.

In the above technical solution, the installation and positioning of the grill is realized through the fixed groove, which makes the disassembly of the grill more convenient.

In particular, the frying pan includes a frying portion and an oil storage portion, the oil storage portion is arranged around the frying portion, and the oil storage portion is lower than the frying portion.

In the above technical solution, the setting of oil storage portion, when frying the ingredients, the oil exuded from the ingredients can be discharged to the oil storage portion in time, to make the frying effect better.

In particular, a sliding groove is formed on a side wall of the upper oven base, the oil storage portion is provided with an oil drain hole, a lower end of the oil drain hole communicates with the sliding groove; an oil storage box is arranged in the sliding groove under the oil drain hole for collecting oil discharged from the oil drain hole; the oil storage box is slidably connected in the sliding groove so that the oil storage box is able to be pulled out from the sliding groove.

In the above technical solution, the setting of an oil drain hole and an oil storage box, the excess oil in the oil storage portion can be discharged into the oil storage box in time for collection, and the oil storage box can be pulled out by sliding to clean up the stored oil in time, making the use of the frying pan more lasting and stable.

In particular, a plurality of convex strips are provided on an inner wall of a lower end of the sliding groove, cross section of the convex strips is in a circular arc convex-shape, and the convex strips abut against an end of the oil storage box away from a bottom of the sliding groove for positioning the oil storage box.

In the above technical solution, the oil storage box is installed and positioned through the convex strip, which makes the position of the oil storage box more stable after installation.

To sum up, the present application includes at least one of the following beneficial technical effects:
(1) the integrated oven for pan-frying, roasting and fumigation has rich functions, and can cook foods with various flavors, such as pan-frying, frying, low-temperature tender roasting, tender roasting inside and fried roasting outside, fumigation and roasting, making the processing of the ingredients more diversified;
(2) the oil outlet, grease pan, oil drain hole and oil storage box are arranged to facilitate the collection and cleaning of oil during use;
(3) by setting the closing plate, when the closing plate is turned over and opened, the ingredient are taken out from the roasting cavity, the closing plate can form a receiving part below. On the one hand, it can reduce the direct drop of oil to the ground. On the other hand, it can also fall on the closing plate in case of the ingredients falling, making the overall use more convenient. In addition, it can also be used to put some sundries.

DETAILED DESCRIPTION

The present application will be described in further detail below with reference to FIGS. 1-8.

Figure 1:
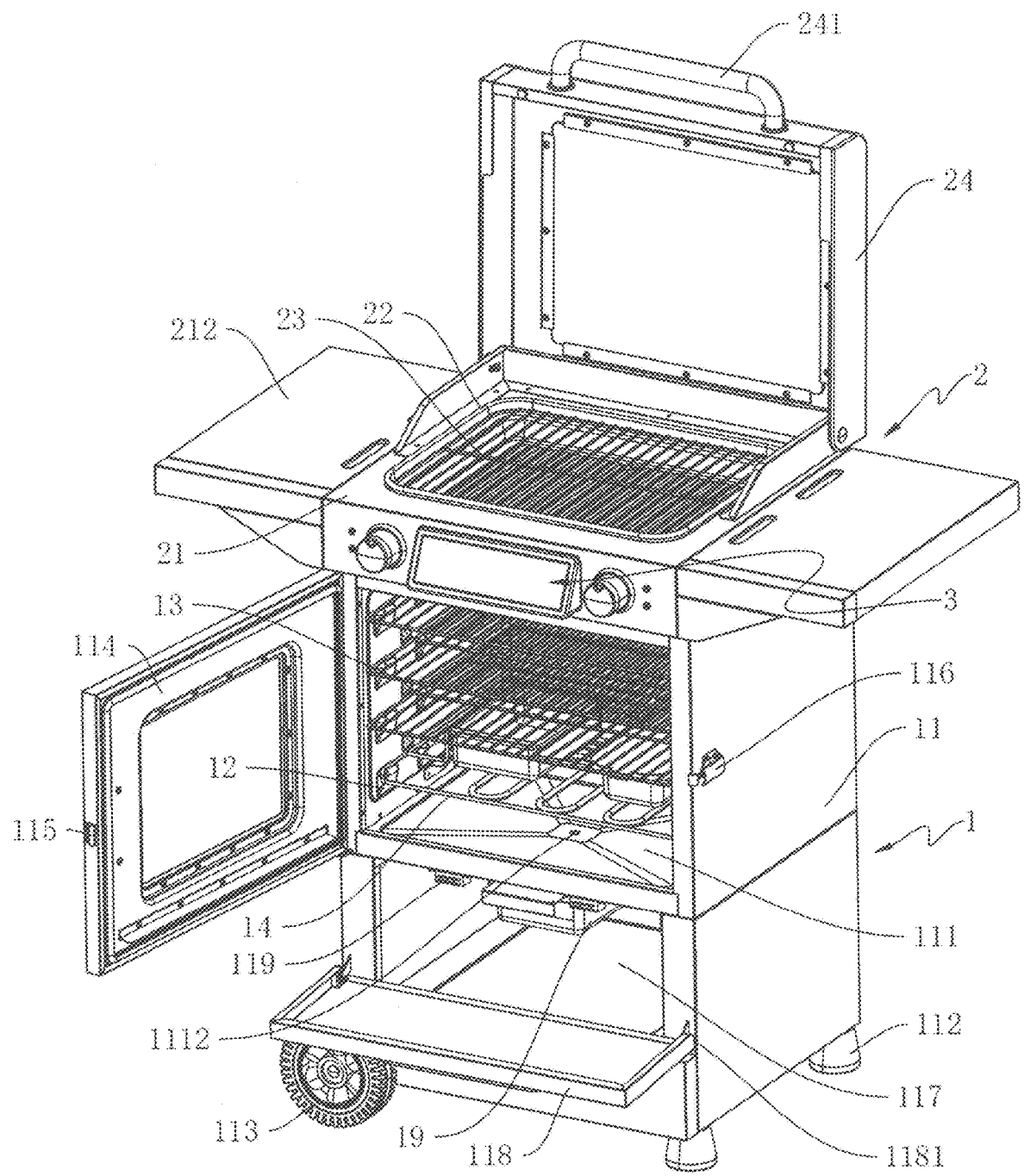
FIG. 1 is an overall schematic diagram according to an embodiment.

An integrated oven with functions of frying, roasting and smoking according to an embodiment of the present application, as shown in FIG. 1, includes a lower oven body 1 and an upper oven body 2.

The lower oven body 1 includes a lower oven base 11. Two support feet 112 are arranged on one edge of a lower end face of the lower oven base 11. Two trolley wheels 113 are rotatable connected to the lower oven base 11 on one edge of the lower end surface away from the support feet 112. When it is necessary to move, the integrated oven may be pried up by taking the trolley wheels 113 as support points, so that the support feet 112 are separated from the ground, and at this time, the integrated oven is driven to move by the trolley wheels 113.

A roasting cavity 111 is provided at a front end face of the lower oven base 11. Support blocks 12 are arranged on two inner walls of the roasting cavity 111 opposite to each other in a horizontal direction. The support blocks 12 are arranged in four layers on each of the two inner walls in a vertical direction, and heights of each layer of the support blocks 12 on one of the two side walls is in one-by-one correspondence to that on the other one of the two side walls.

Figure 2:
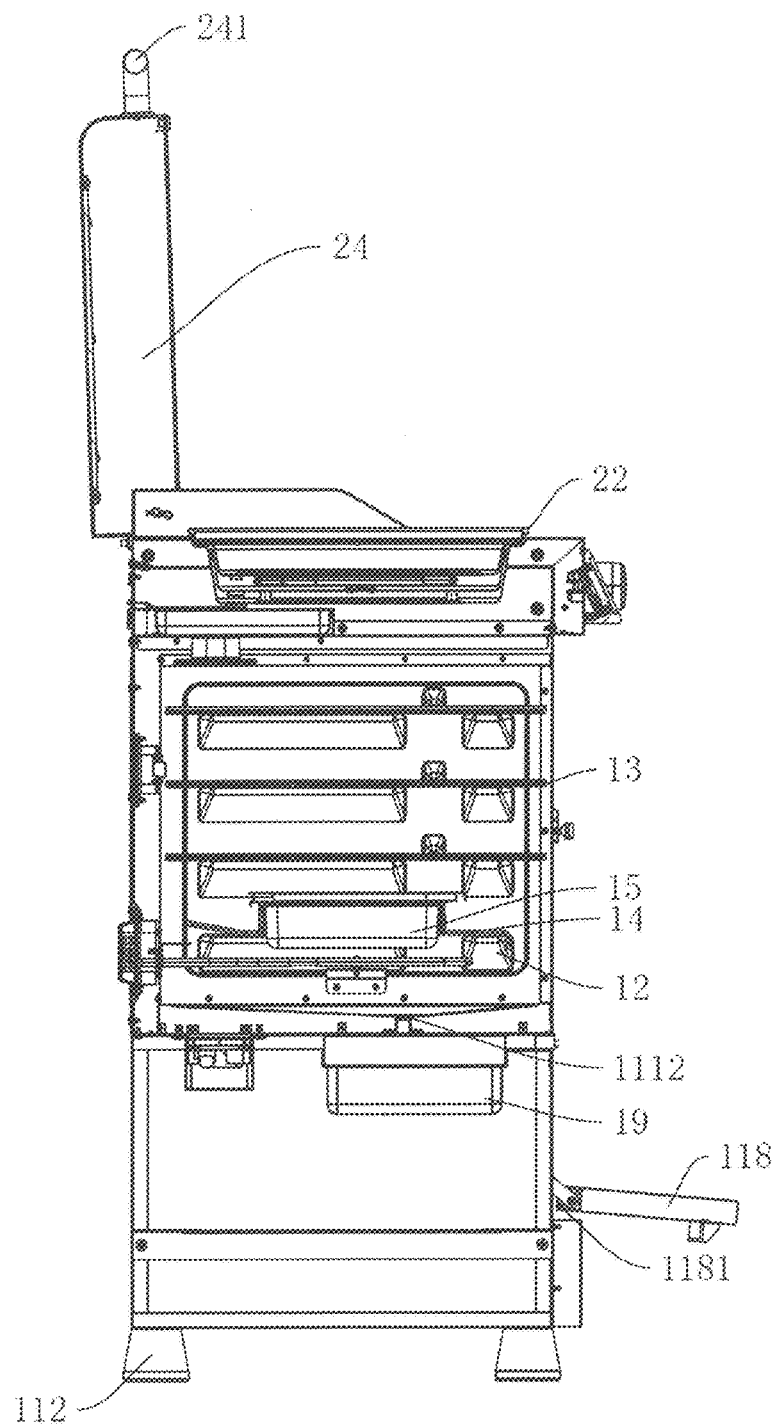
FIG. 2 is a schematic cross-sectional view according to an embodiment.

Referring to FIGS. 1 and 2, three layers of load grids 13 are arranged in the roasting cavity 111. The load grid 13 is a metal mesh, and the three layers of load grids 13 are arranged at intervals in the vertical direction. The three layers of load grids 13 in the roasting cavity 111 are respectively arranged on upper three layers of the support blocks 12. The load grids 13 are arranged on corresponding support block 12, and two ends of each of the load grids 13 are supported by the support blocks 12. Installation of the load grids 13 can be conveniently achieved by placing them on the support blocks 12 according to the actual use.

Figure 3:
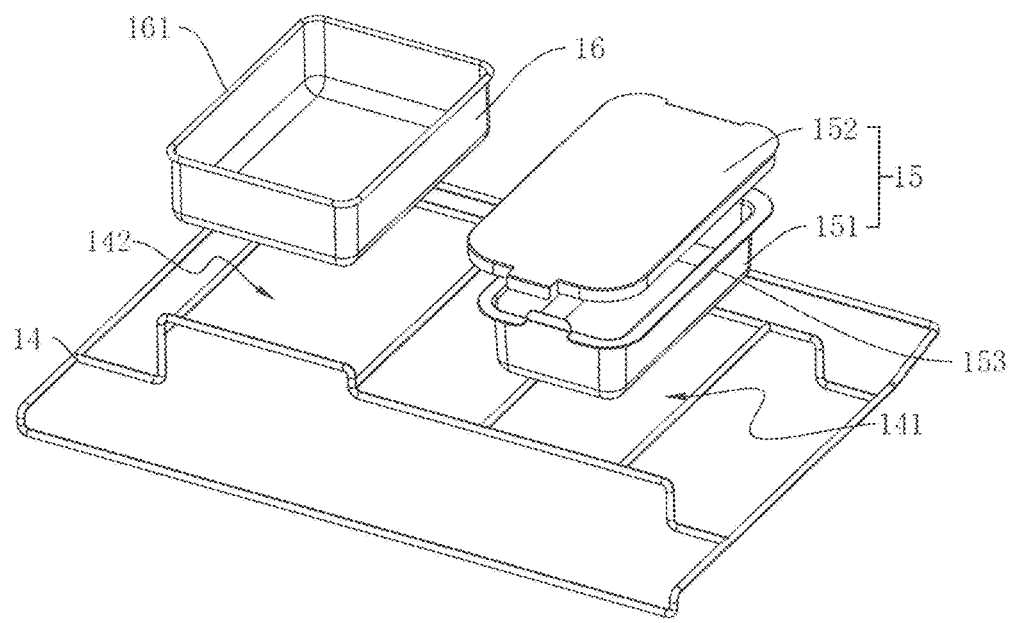
FIG. 3 is a schematic structural diagram of a bearing frame according to an embodiment.

Referring to FIGS. 1 and 3, a bearing frame 14 is also arranged in the roasting cavity 111 below all load grids 13. Lower end faces of both ends of the bearing frame 14 abuts against upper end faces of support blocks 12 on the lowest layer for supporting and positioning the bearing frame 14. A first accommodating hole 141 and a second accommodating hole 142 are provided on an upper end face of the bearing frame 14. In actual production, the bearing frame 14 is formed by splicing metal rods.

A smoking box 15 is arranged in the first accommodating hole 141. The smoking box 15 includes a box body 151 and a box cover 152. A cavity is formed on the upper end face of the box body 151 for storing smoking materials. The box cover 152 covers on the cavity of the box body 151, and a gap is reserved between the box cover 152 and the box body 151. A first limiting flange 153 is provided on an outer side wall of the box body 151. The first limiting flange 153 is arranged on an upper end of the box body 151. With installation of the smoking box 15 into the first accommodating hole 141, a lower end face of the first limiting flange 153 abuts against the upper end face of the bearing frame 14 to restrict the smoking box 15 from penetrating through the first accommodating hole 141, which achieves the installation and positioning of the smoking box 15.

A water basin 16 is arranged in the second accommodating hole 142, and the opening of the water basin 16 is upward. A second limiting flange 161 is provided fixedly on the outer peripheral wall of the water basin 16. The second limiting flange is arranged on the upper end of the water basin 16. With installation of the water basin 16 into the second accommodating hole 142, the lower end face of the second limiting flange 161 abuts against the upper end face of the bearing frame 14 to restrict the water basin 16 from penetrating through the second accommodating hole 142, which achieves the installation and positioning of the water basin 16.

Figure 4:
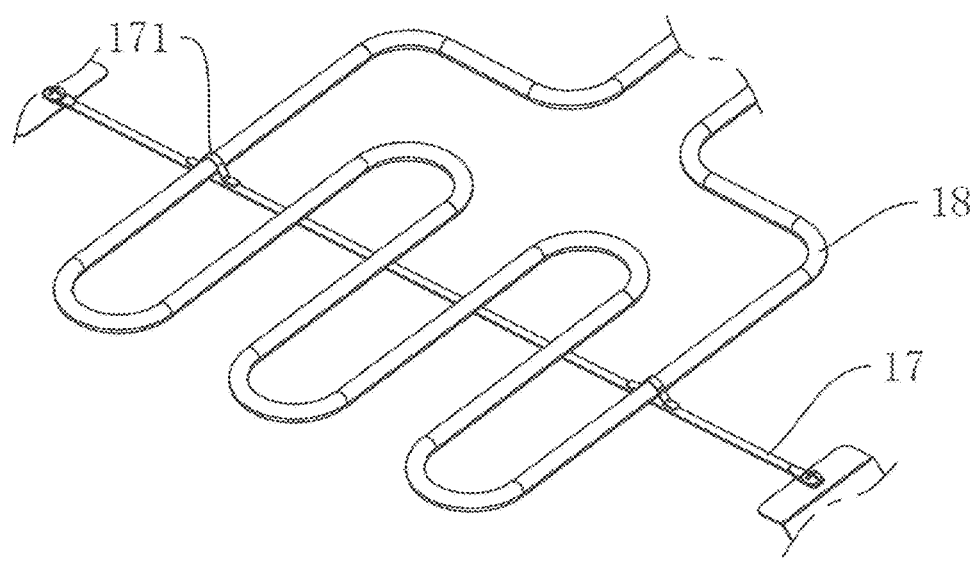
FIG. 4 is a schematic diagram of an installation structure of a first heating component according to an embodiment.

Referring to FIGS. 1 and 4, a support part 17 is provided in the roasting cavity 111 under the bearing frame 14. The support part 17 is in a rod-shape. The support part 17 is arranged in a horizontal direction, and both ends of the support part 17 are fixed to the inner side walls, opposite to each other, of the roasting cavity 111. The lower oven base 11 is also provided with a first heating component 18, which is an electric heating tube. The first heating component 18 is arranged in the roasting cavity 111. The first heating component 18 is arranged below the bearing frame 14 and above the support part 17. The first heating component 18 generates heat after being energized for heating the smoking box 15 to produce smoke and for heating the water basin 16. One or more tightening strips 171 are fixed on the support part 17 for fixing the first heating component 18 on the upper end face of the support part 17. With fixing by the tightening strips 171, the first heating component 18 can be stably installed.

Figure 5:
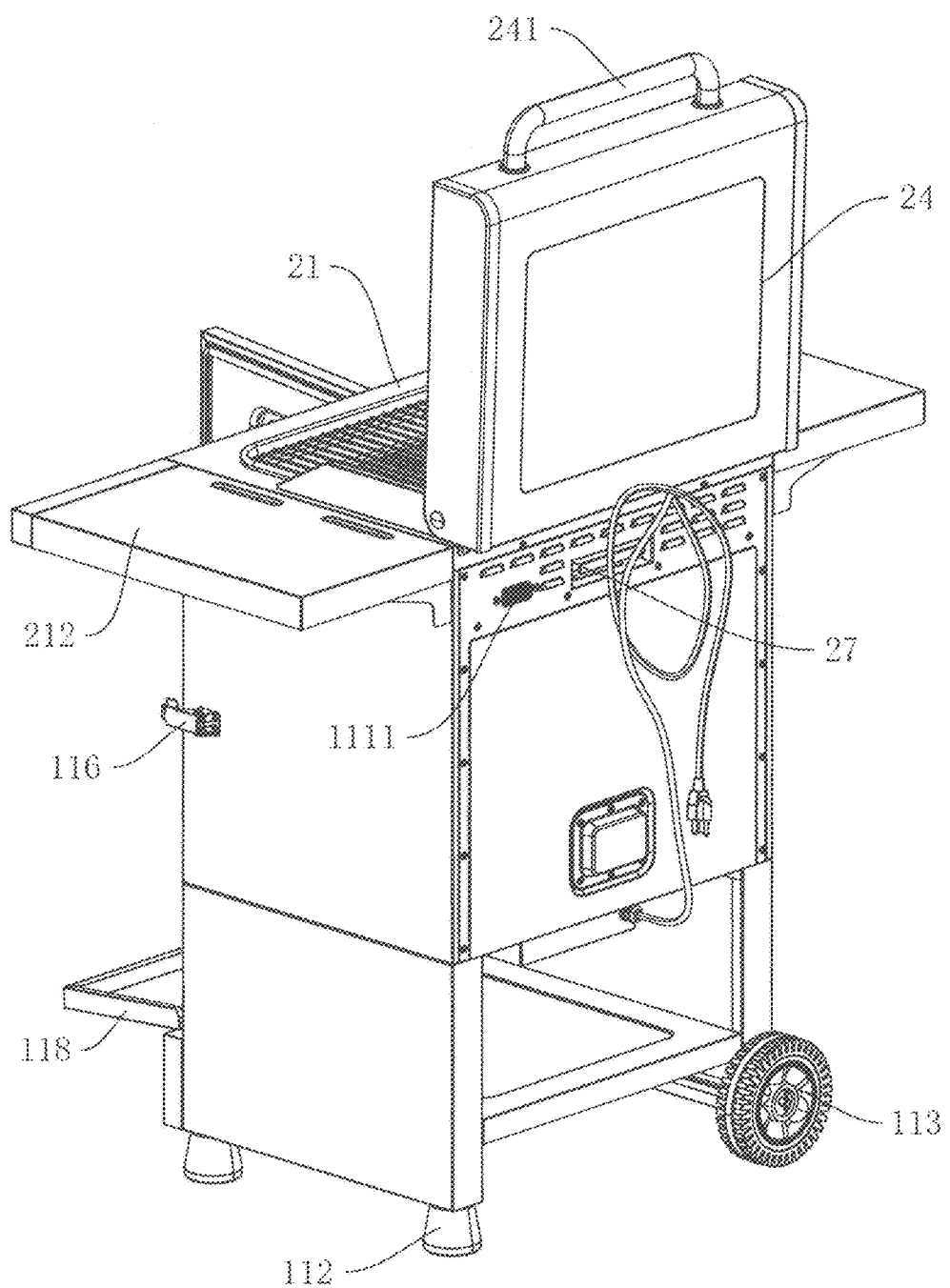
FIG. 5 is a schematic diagram of a back structure according to an embodiment.

Referring to FIGS. 1 and 5, a cover plate 114 is hinged with the front end face of the lower oven base 11, and a hinge axis of the cover plate 114 is located on one side of the roasting cavity 111 in the horizontal direction and is arranged vertically. When the cover plate 114 is turned over to abut against the front end face of the lower oven base 11, the cover plate 114 covers the roasting cavity 111 to isolate the roasting cavity 111 from the outside. A buckling plate 115 is arranged at one end of the cover plate 114 away from the hinge axis, and a buckling part 116 is hinged on a side wall of the lower oven base 11 away from the hinge axis of the cover plate 114. When the cover plate 114 covers the roasting cavity 111, the buckling part 116 turns over to buckle with the buckling plate 115. At this time, the cover plate 114 cannot be opened due to the limiting by means of the buckling part 116 and the buckling plate 115, so that the cover plate 114 covers the roasting cavity 111 more stably. An exhaust hole 1111 is provided on an inner wall of the roasting cavity 111 close to the inner top of the roasting cavity 111, and the exhaust hole 1111 is communicated with the outside for exhaust.

Referring to FIG. 1, a mounting cavity 117 is formed on the front end face of the lower oven base 11 under the roasting cavity 111. The inner bottom surface of the roasting cavity 111 is in a gradually shrinking notch shape. An oil outlet 1112 is formed at the lowest part of the inner bottom surface of the roasting cavity 111, and the lower end of the oil outlet 1112 is communicated to the mounting cavity 117. A grease pan 19 is arranged in the mounting cavity 117 under the oil outlet 1112. When the oil in the roasting cavity 111 is discharged from the oil outlet 1112, the oil flows through the oil outlet 1112 and enters the grease pan 19 for collection. The grease pan 19 is slidably connected to the mounting cavity 117 in the horizontal direction. A hand-held part is provided on the front end face of the grease pan 19. The operator can pull the hand-held part to pull the grease pan 19 out of the mounting cavity 117, to facilitate the cleaning of the oil in the grease pan 19.

The size of the mounting cavity 117 is larger than that of the grease pan 19. A guide sliding groove is provided in the mounting cavity 117, which guides sliding of the grease pan 19. The lower bottom-face of the mounting cavity 117 serves as a load-bearing base, so that the mounting cavity 117 can also be used to put barbecue tools.

The front end face of the lower oven base 11 is also hinged with a closing plate 118, which is made of ferromagnetic material. The hinge axis of the closing plate 118 is below the mounting cavity 117. The hinge axis of the closing plate 118 is horizontal and parallel to the front end face of the lower oven base 11. A magnet 119 is arranged in the mounting cavity 117, which is close to the upper end of the mounting cavity 117. Two magnets 119 are correspondingly arranged on both sides of the grease pan 19. When the closing plate 118 closes the mounting cavity 117, the closing plate 118 is attracted by the magnet 119 for fixation.

The length of the closing plate 118 in the hinge axis direction is greater than the width of the roasting cavity 111. The closing plate 118 is provided with an abutting part 1181. When the closing plate 118 is turned to the abutting part 1181 to abut against the front end face of the lower oven base 11, the closing plate 118 extends away from the lower oven base 11. When the closing plate 118 is turned and opened, a concave cavity is formed on the upward end face of the closing plate 118. At this time, when the ingredients are taken out from the roasting cavity 111, the closing plate 118 can serve as a receiving part below. On the one hand, the concave cavity of the closing plate 118 can receive the dropping oil drop to prevent the oil from dripping directly to the ground; on the other hand, it can also prevent the food from falling directly to the ground, which improves the convenience for usage. In addition, some sundries may be placed the upper end face of the turned closing plate 118.

Referring to FIG. 1, the upper oven body 2 includes an upper oven base 21, which is fixed on the lower oven base 11. A mounting groove 211 is provided on the upper end face of the upper oven base 21, and a frying pan 22 is arranged in the mounting groove 211. A side plate 212 is arranged at each of two sides of the upper oven base 21 for ingredients to be temporarily placed. An upper oven cover 24 is hinged with the upper end face of the upper oven base 21. The upper oven cover 24 may cover on the upper end of the frying pan 22. The hinge axis of the upper oven cover 24 is horizontal and close to the rear end of the upper oven base 21. A handle 241 is provided at an end of the upper oven cover 24 away from the hinge axis. The operator turns the upper oven cover 24 by holding the handle 241, so that the upper oven cover 24 can be turned to be open.

Figure 6:
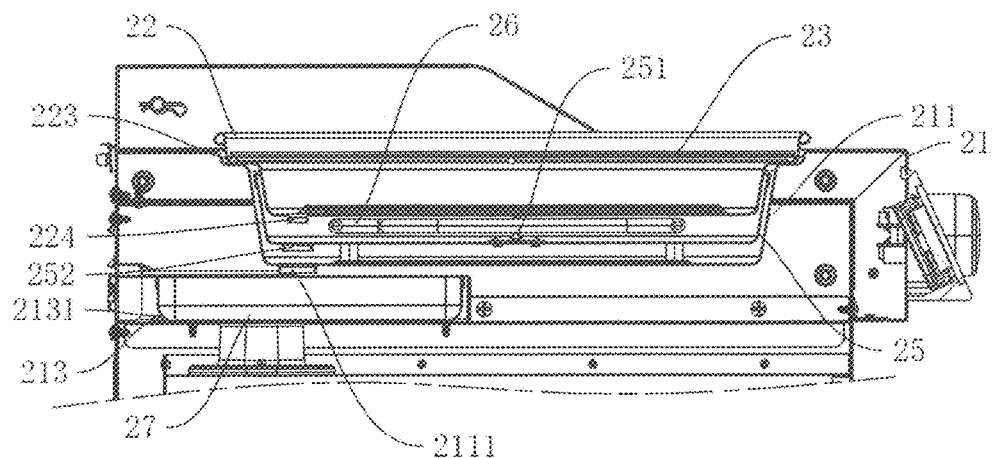
FIG. 6 is a partial sectional view according to an embodiment.
Figure 7:
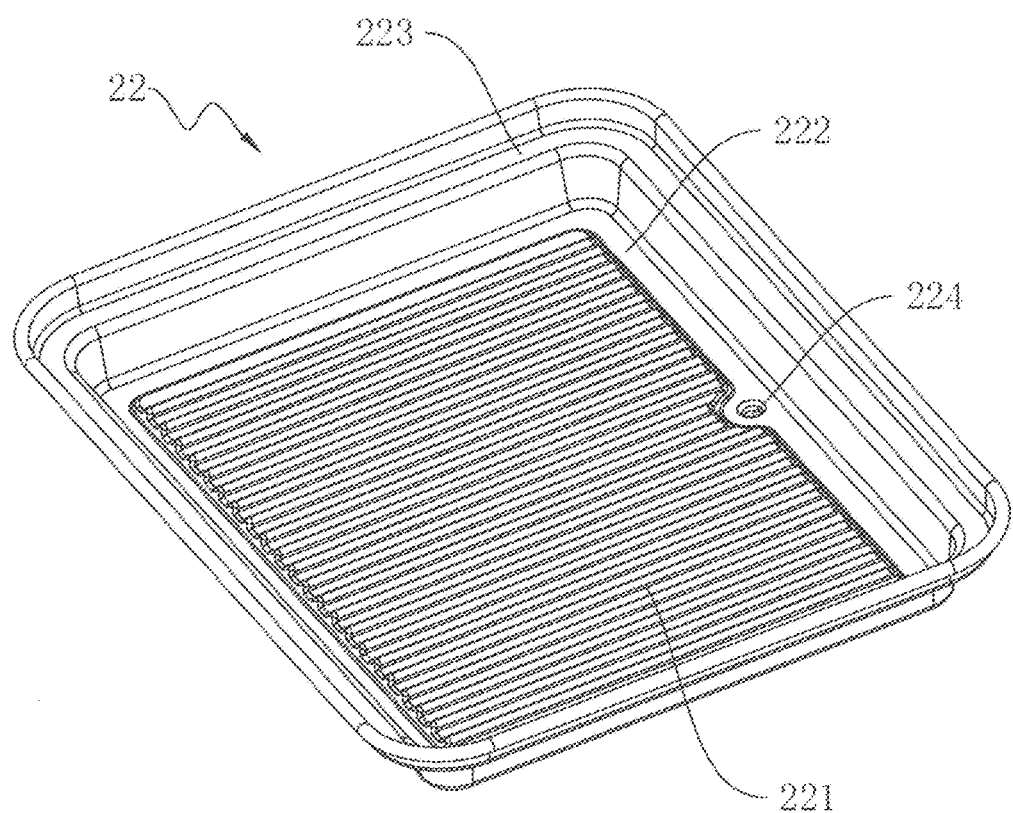
FIG. 7 is a schematic structural diagram of a frying pan according to an embodiment.

Referring to FIGS. 6 and 7, the frying pan 22 includes a frying portion 221 and an oil storage portion 222. The oil storage portion 222 is arranged around the frying portion 221, and the oil storage portion 222 is lower than the frying portion 221. A plurality of ridges are formed on the upper end face of the frying portion 221, the length direction of the ridges is parallel to the width direction of the frying pan 22 in, and the plurality of ridges are distributed at intervals in the length direction of the frying pan 22.

A fixed groove 223 is provided on the upper end face of the frying pan 22, in which a grill 23 is arranged. The grill 23 is arranged above the frying portion 221 and the oil storage portion 222. The installation and positioning of the grill 23 is achieved with the fixed groove 223. When frying food with the frying pan 22, the grill 23 can be removed. When it is necessary to roast, the grill 23 may be installed in the fixed groove 223 for placing ingredients.

Figure 8:
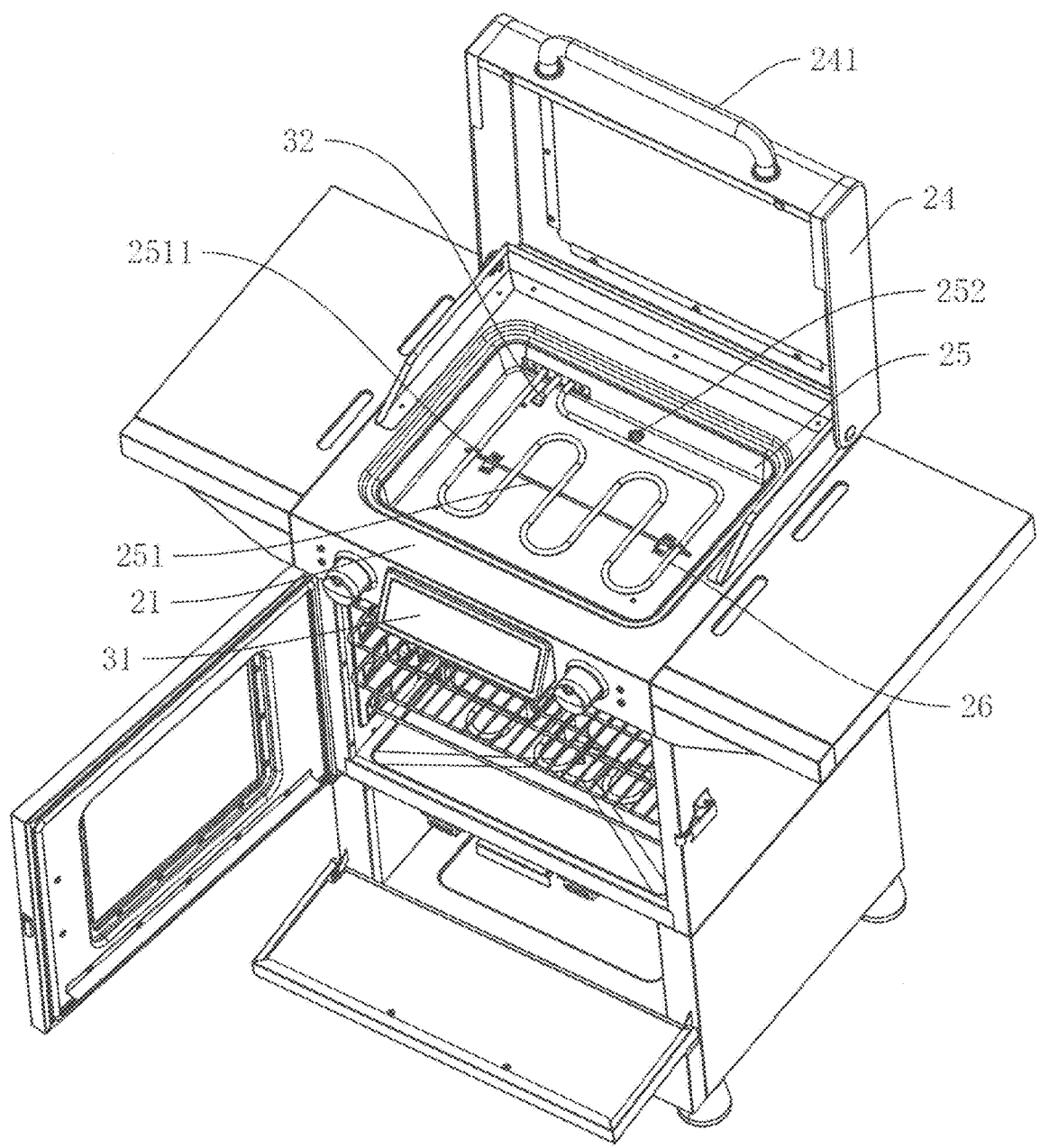
FIG. 8 is a schematic diagram of an installation structure of a second heating component according to an embodiment.

Referring to FIGS. 6 and 8, the mounting groove 211 is also arranged with a bearing plate 25, which is arranged below the frying pan 22. A second heating component 26 is provided on the upper oven base 21. The second heating component 26 may be an electric heating tube. The second heating component 26 penetrates through the side wall of the bearing plate 25 to extend into the bearing plate 25 and is arranged below the frying pan 22. The second heating component 26 is energized and heated to heat the frying pan 22.

A supporting strip 251 is arranged under the second heating component 26, and is fixed in the bearing plate 25. A fixing strip 2511 is also arranged on the supporting strip 251. The second heating component 26 is fixed to the supporting strip 251 by clamping the second heating component 26 with the fixing strip 2511. The second heating component 26 is isolated from the inner bottom surface of the bearing plate 25 by means of the fixing strip 2511, which reduces the contact surface between the second heating component 26 and the bearing plate 25, and reduces the probability of the direct transfer of heat to the bearing plate 25, resulting in the overheating of the bearing plate 25 and affecting the temperature of the lower roasting cavity 111.

Referring to FIG. 6, an oil drain hole 224 is formed on the oil storage portion 222 of the frying pan 22. A hole 252 is provided on the bearing plate 25 at a positon corresponding to the oil drain hole 224, and a through-hole 2111 is formed in the mounting groove 211 at a position corresponding to the oil drain hole 224. The oil drain hole 224, the hole 252 and the through-hole 2111 are round holes, the axes of which coincide with each other. The diameter of the oil drain hole 224 is less than the diameter of the hole 252, and the diameter of the hole 252 is less than the diameter of the through-hole 2111.

Referring to FIGS. 5 and 6, a sliding groove 213 is formed on the rear end face of the upper oven base 21 below the mounting groove 211, and the through-hole 2111 is communicated with the sliding groove 213. An oil storage box 27 is provided in the sliding groove 213 below the oil drain hole 224. When cooking food with the frying pan 22 or the grill 23, the excess oil enters the oil storage box 27 through the hole 252 and through-hole 2111 along the oil drain hole 224 for collection. The oil storage box 27 is slidably connected to the sliding groove 213. When it is necessary to clean the oil storage box 27, the operator can take out the oil storage box 27 from the sliding groove 213.

Convex strips 2131 are provided on the inner wall of the lower end of the sliding groove 213. The cross section of the convex strips 2131 is in a circular arc convex-shape. When the oil storage box 27 is placed into the sliding groove 213, the convex strip 2131 abuts against the position of the oil storage box 27 away from the bottom of the sliding groove 213 to form a limit. When the oil storage box 27 needs to be taken out, the operator is required to pull out the oil storage box 27, which makes the positioning of the oil storage box 27 more stable after installation.

Referring to FIGS. 1 and 8, a control assembly 3 is provided on the upper oven base 21, including a control panel 31, a controller and a temperature sensor 32 connected to the controller. The temperature sensor 32 in the upper oven base 21 is arranged in the bearing plate 25. The temperature sensor 32 is electrically connected to the controller, and the controller controls the temperature of the second heating component 26 to reach the preset temperature value. The temperature sensor 32 in the lower oven base 11 extends into the roasting cavity 111. The control panel 31 is used to input the preset temperature value, to realize the oven temperature value and timing time value of the upper oven base 21 and the lower oven base 11. The control panel 31 is also arranged with a display panel, which is used to display the current temperature.

The working principle of the embodiment is:
when it is necessary to make smoked flavor ingredients, put the ingredients on the load grid 13 in the roasting cavity 111, and then load the smoking material into the smoking box 15. Heat the smoking box 15 through the first heating component 18 to make the smoking material produce smoke and realize the effect of fumigation and roasting. When it is necessary to make ingredients with boiled taste, put the ingredients into the water basin 16, fill an appropriate amount of water in the water basin 16, and heat the water basin 16 through the first heating component 18 to realize boiling.

The frying pan 22 of the upper oven body 2 can be used for pan-frying or frying according to the amount of oil. When used for pan-frying, the oil drain hole 224 needs to be blocked first. When the grill 23 is arranged, the barbecue food can also be realized. In addition, the ingredients can also be processed through the cooperation of the lower oven body 1 and the upper oven body 2. For example, the ingredients after the fumigation are further pan-fried, or the ingredients after tender roasting in the roasting cavity are further fried or roasted. The integrated oven for pan-frying, roasting and fumigation has rich functions, and can cook foods with various flavors, such as pan-frying, frying, low-temperature tender roasting, tender roasting inside and fried roasting outside, fumigation and roasting, making the processing of the ingredients more diversified.

The above are the preferred embodiments of the present application and do not limit the scope of protection of the present application. Therefore, all equivalent changes made according to the structure, shape and principle of the present application shall be covered by the scope of protection of the present application.

What is claimed is:

1. An oven integrated with functions of frying, roasting and smoking, comprising: a lower oven body and an upper oven body; wherein,
    the lower oven body comprises a lower oven base, a roasting cavity is formed on a side wall of the lower oven base, a load grid is arranged in the roasting cavity, a smoking box and a water basin are arranged in the roasting cavity, a first heating component is provided on the lower oven base, the first heating component is configured for heating the smoking box to produce smoke and for heating the water basin, and a cover plate for closing the roasting cavity is hinged with the lower oven base;
    the upper oven body comprises an upper oven base arranged on the lower oven base, a frying pan is provided on the upper oven base, a grill is detachably arranged on the frying pan, a second heating component is provided on the upper oven base, and the second heating component is configured for heating the frying pan;
    the frying pan comprises a frying portion and an oil storage portion, the oil storage portion is arranged around the frying portion, and the oil storage portion is lower than the frying portion;
    a sliding groove is formed on a side wall of the upper oven base, the oil storage portion is provided with an oil drain hole, a lower end of the oil drain hole communicates with the sliding groove, an oil storage box is arranged in the sliding groove under the oil drain hole for collecting oil discharged from the oil drain hole, and the oil storage box is slidably connected in the sliding groove so that the oil storage box is able to be pulled out from the sliding groove;
    a plurality of convex strips are provided on an inner wall of a lower end of the sliding groove, a cross section of the plurality of convex strips is in a circular arc convex-shape, and the plurality of convex strips abut against an end of the oil storage box away from a bottom of the sliding groove for positioning the oil storage box.

2. The oven integrated with functions of frying, roasting and smoking according to claim 1, wherein a bearing frame is arranged in the roasting cavity, the bearing frame is arranged under the load grid and above the first heating component, and a first accommodating hole and a second accommodating hole are formed on the bearing frame;
    the smoking box is arranged in the first accommodating hole, a first limiting flange is formed on the smoking box, and the first limiting flange is configured to restrict the smoking box from penetrating through the first accommodating hole;
    the water basin is arranged in the second accommodating hole, and a second limiting flange is formed on the water basin, and the second limiting flange is configured to restrict the water basin from penetrating through the second accommodating hole.

3. The oven integrated with functions of frying, roasting and smoking according to claim 2, wherein a plurality of load grids are arranged in a vertical direction in three layers, a plurality of support blocks are provided on each of two inner side walls, opposite to each other, of the roasting cavity, the plurality of support blocks are arranged in four layers in the vertical direction, and support blocks of the plurality of support blocks that are arranged in an upper three layers of the four layers are arranged under the three layers of the plurality of load grids in one-by-one correspondence with the plurality of load grids for supporting the plurality of load grids, support blocks of the plurality of support blocks in a lowest layer of the four layers are arranged under the bearing frame for supporting the bearing frame.

4. The oven integrated with functions of frying, roasting and smoking according to claim 1, wherein the first heating component is an electric heating tube, a support part is arranged in the roasting cavity under the first heating component, one or more tightening strips are arranged on the support part for fixing the first heating component on an upper end face of the support part.

5. The oven integrated with functions of frying, roasting and smoking according to claim 1, wherein an inner bottom surface of the roasting cavity is in a shape of a gradually shrinking notch, a mounting cavity is formed on the side wall of the lower oven base, and the mounting cavity is arranged under the roasting cavity;
    an oil outlet is provided at a lowest part of the inner bottom surface of the roasting cavity, a lower end of the oil outlet communicates with the mounting cavity, a grease pan is arranged in the mounting cavity under the oil outlet for collecting oil discharged from the oil outlet, and the grease pan is slidably connected to the mounting cavity in a horizontal direction so that the grease pan is able to be pulled out from the mounting cavity.

6. The oven integrated with functions of frying, roasting and smoking according to claim 1, wherein a fixed groove is formed on an upper end face of the frying pan for accommodating the grill.

* * * * *